United States Patent [19]

Overman

[11] Patent Number: 5,049,259

[45] Date of Patent: Sep. 17, 1991

[54] MEMBRANE PROCESS FOR DRYING LIQUID HYDROCARBONS

[75] Inventor: Dana C. Overman, Pleasant Hill, Calif.

[73] Assignee: The Dow Chemical Company, Midland, Mich.

[21] Appl. No.: 301,695

[22] Filed: Jan. 25, 1989

Related U.S. Application Data

[63] Continuation of Ser. No. 191,670, May 9, 1988, abandoned, which is a continuation of Ser. No. 922,980, Oct. 24, 1986, abandoned.

[51] Int. Cl.$^5$ ............................................. C10G 25/00
[52] U.S. Cl. ..................................... 208/188; 585/818; 585/830; 210/500.21; 210/500.29; 210/500.3; 210/500.31; 210/500.32
[58] Field of Search .............................. 208/187, 188; 210/500.21, 500.3, 500.31, 500.32, 500.29; 585/818, 830

[56] References Cited

U.S. PATENT DOCUMENTS

| | | | |
|---|---|---|---|
| 1,885,393 | 11/1932 | Van Schaack | 210/644 |
| 2,953,502 | 9/1960 | Binning et al. | 210/500.32 |
| 3,035,060 | 5/1962 | Binning et al. | 208/187 |
| 3,062,737 | 11/1962 | Azorlosa et al. | 210/644 |
| 3,096,380 | 7/1963 | Bolen | 208/187 |
| 3,215,619 | 11/1965 | Brooke | 208/187 |
| 3,268,442 | 8/1966 | Pall et al. | 208/187 |
| 3,398,208 | 8/1968 | Ward | 208/187 |
| 3,417,013 | 12/1968 | Roberts | 208/187 |
| 3,654,208 | 4/1972 | Blake | 210/644 |
| 3,735,558 | 5/1973 | Skarstrom et al. | 55/16 |
| 3,956,112 | 5/1976 | Lee et al. | 210/644 |
| 4,035,291 | 7/1977 | Chiang et al. | 210/640 |
| 4,067,805 | 1/1978 | Chiang et al. | 210/640 |
| 4,127,625 | 11/1978 | Arisaka et al. | 210/500.3 |
| 4,368,112 | 1/1983 | Thompson et al. | 208/321 |
| 4,497,640 | 2/1985 | Fournie et al. | 55/16 |
| 4,541,972 | 9/1985 | Wernick | 210/500.3 |
| 4,549,012 | 10/1985 | Sharma | 210/500.2 |
| 4,584,092 | 4/1986 | Kanemato et al. | 208/188 |

FOREIGN PATENT DOCUMENTS

| | | | |
|---|---|---|---|
| 312347 | 4/1989 | European Pat. Off. | |
| 58-180204 | 10/1983 | Japan | 55/16 |
| 61-25608 | 2/1986 | Japan | 210/500.29 |

*Primary Examiner*—Anthony Mc Farlane
*Attorney, Agent, or Firm*—Janet Pauline Clark

[57] ABSTRACT

This invention relates to a process for drying liquid hydrocarbons using cellulosic membranes.

8 Claims, No Drawings

MEMBRANE PROCESS FOR DRYING LIQUID HYDROCARBONS

CROSS-REFERENCE TO RELATED APPLICATIONS

This Application is a continuation of Applicant's co-pending U.S. patent application Ser. No. 191,670, filed May 9, 1988, now abandoned, which in turn is a continuation of Applicant's U.S. application Ser. No. 922,980, filed Oct. 24, 1988, now abandoned.

BACKGROUND OF THE INVENTION

This invention relates to a membrane process for drying liquid hydrocarbons to low levels of water.

Hydrocarbons are commonly used as motor fuels and as chemical feedstocks in polymerization and other reaction processes. Hydrocarbons may absorb moisture during shipping, storage, and use. The presence of water in hydrocarbons is generally undesirable because of the possibility of corrosion of piping and equipment. An additional problem that may be encountered is the freezing of piping and equipment in cold weather. Further, the presence of water in motor fuels may cause poor engine or motor performance. Water contamination may also interfere with the hydrocarbon's intended use as a chemical intermediary during polymerization. For these and like reasons, it is frequently desirable to remove water from hydrocarbons to low levels.

Removing water from hydrocarbons to low levels can be costly and complex. Conventional methods of removing water include mechanical separation such as decanting. However, mechanical separation only removes water which exists as a separate phase and does not remove water which is entrained or dissolved in the hydrocarbon phase. Mechanical separation is insufficient when water must be removed to low levels. Distillation has also been used to remove water from hydrocarbons, but distillation is an energy-intensive process. Further problems associated with distillation include limitations on the level of water which can be removed because water forms azeotropes with many hydrocarbons. Other methods of removing water which have been used include the use of drying agents such as glycols, silica gels, and molecular sieves. Such systems are generally large and expensive. Problems with these drying methods include a limited absorption capacity for water, which requires replacement or regeneration of the drying agent. Such drying processes are therefore batch rather than continuous. If continuous operation is required, additional capital must be expended to install duplicate drying columns or beds which can be used when the completely exhausted columns or beds are being regenerated or replaced. Effluent from the columns or beds generally must be monitored to determine when the capacity for water absorption has been reached in order to determine when regeneration or replacement of the drying agents is required.

What is needed is a continuous, unattended, and inexpensive process which will dry liquid hydrocarbons to low levels of water.

SUMMARY OF THE INVENTION

The invention is a process for dehydrating liquid hydrocarbons comprising the steps of (a) contacting one side (upstream) of a semipermeable membrane with a mixture comprised of at least one $C_{4-15}$ liquid hydrocarbon and water, wherein the semipermeable membrane is fabricated from a cellulosic polymer;

(b) contacting the opposite (downstream) side of the membrane with a sweep fluid or vacuum under conditions such that a chemical potential gradient is created across the membrane such that water selectively permeates through the membrane;

(c) removing the permeated water from the downstream side of the membrane; and (d) removing the nonpermeated liquid $C_{4-15}$ hydrocarbon(s) from the upstream side of the membrane.

This invention may be used to remove water which is dissolved or entrained in liquid hydrocarbons down to low levels and may also be used to remove free water which is present as a second phase. The process is continuous and may be run unattended. Membrane drying systems are modular and compact so that a minimum of installation area is required. Costs are lower than costs for conventional systems used to dehydrate liquid hydrocarbons.

DETAILED DESCRIPTION OF THE INVENTION

The invention is a process for drying liquid hydrocarbons using cellulosic membranes. The process can be used to separate water which is dissolved or entrained in the liquid hydrocarbon(s), as well as water which exists as a separate phase. The water which exists as a separate phase may first be decanted or mechanically separated from the hydrocarbon phase to enable the process of the invention to operate more effectively.

The invention is useful for removing water from liquid hydrocarbons or mixtures thereof. $C_{4-15}$ liquid hydrocarbons or mixtures thereof are preferred, with $C_{4-12}$ liquid hydrocarbons or mixtures thereof being more preferred. Most preferred are $C_{4-8}$ liquid hydrocarbons or mixtures thereof.

Preferred cellulosic polymers for the present invention include cellulose ethers and cellulose esters. More preferred cellulose ethers and cellulose esters include cellulose acetate, cellulose propionate, cellulose butyrate, cellulose nitrate, cellulose cyanoethylate, cellulose methacrylate, ethyl cellulose, or blends or mixed esters thereof. Mixed esters of cellulose include cellulose acetate butyrate, cellulose acetate propionate, cellulose acetate methacrylate, and the like. Even more preferred polymers are cellulose acetates which include cellulose acetate, cellulose diacetate, cellulose triacetate, or blends or mixed acetates thereof. Most preferred is a commercially available cellulose triacetate containing from about 42.7 to about 44 weight percent acetate.

Processes for fabrication of such cellulosic films and fibers are known. See U.S. Pat. Nos. 3,133,132; 3,283,042; 3,494,780; 3,532,527; 4,127,625; 4,219,517; 4,284,594; 4,322,381; 4,371,487; 4,444,716; and Robert Kesting, *Synthetic Polymeric Membranes*, 2nd Edition, John Wiley & Sons, New York, 1985; incorporated herein by reference. The membranes useful in the present invention may be homogeneous, asymmetric, or composite. The membranes may be fabricated as hollow fibers or flat sheets.

Often the membranes formed by the above techniques will be water-wet. The membranes may be used wet or the membranes may be dried before use. The membranes may be dried by several methods, including freeze drying, solvent exchange, and the like. Such methods are known to one skilled in the art. See U.S. Pat. Nos. 3,415,038; 3,842,515; 4,068,387; 4,080,743, 4,080,744; 4,120,098; 4,127,625; 4,430,807; incorporated herein by reference. Direct air drying should generally be avoided with cellulosic membranes since such drying may cause cracking or pore structure collapse which deleteriously affects membrane performance.

Since the water transport rate through the membrane is inversely proportional to the membrane thickness, the discriminating layer of the membrane is preferably as thin as possible while possessing adequate mechanical strength under use conditions and good separation characteristics. Overall thickness of the membrane should be thick enough to provide sufficient mechanical strength under membrane use conditions but not so thick as to significantly reduce the transport rate through the membrane. The discriminating layer must not be so thin as to contain substantial defects which disrupt the continuity of the discriminating layer so that separation of components cannot be achieved. The overall membrane thickness for homogeneous membranes is preferably between about 5 microns and 150 microns, more preferably between about 10 microns and about 50 microns. In the case of hollow fibers, the outer diameter of such fibers is preferably between about 100 microns and about 500 microns, more preferably between about 200 microns and about 350 microns. Generally asymmetric cellulosic membranes will have a discriminating layer of less than about 1.0 microns, more preferably less than about 0.5 microns, most preferably less than about 0.2 microns; with a thicker porous support layer which is preferably about 10 microns to about 200 microns thick, more preferably about 25 microns to about 150 microns thick, most preferably about 50 microns to about 100 microns thick. Preferably composite cellulosic membranes will have a discriminating layer which is less than about 1.0 microns, more preferably less than about 0.5 microns, most preferably less than about 0.2 microns cast or coated onto a porous or nonporous support. Preferably the support is porous so that the support presents minimal resistance to transport through the composite membrane. Any polymeric material to which the cellulosic discriminating layer will adhere, which possesses sufficient mechanical properties under membrane use conditions, and which does not unduly interfere with transport through the composite membrane may be used. Preferred support materials include cellulose esters, polysulfones, polyethersulfones, polyolefins, polycarbonates, polyimides, polyetheretherketones (PEEK), and the like. The support layer is preferably from about 10 microns to about 200 microns thick, more preferably from about 50 microns to about 100 microns thick.

The membranes may be optionally dried before use. If the membranes are dried, the membranes may be dried prior to or subsequent to assembly into a device. If the membranes are dried subsequent to assembly into a device, such a device design should allow sufficient tolerance for shrinkage of the membrane upon drying.

Tubesheets are affixed to the cellulosic membranes by techniques known in the art. Methods of tubesheet formation and suitable tubesheet materials are disclosed in U.S. Pat. Nos. 3,339,431; 3,619,459, 3,722,695; 3,728,425; 3,755,034; and 4,138,460; incorporated herein by reference.

When the membrane device is fabricated from water-wet membranes, the tubesheet material used must adhere sufficiently to the membrane so that the bond between the membrane and the tubesheet will be maintained under conditions of fabrication and use. Preferred tubesheet materials for water-wet membranes of cellulosic materials include compositions containing mixtures of diglycidyl ether of dihydroxybenzene and polyglycidyl ether of polyhydric phenols cured with near stoichiometric amounts of polyamine or polyamide epoxy curing agents.

The cellulosic membranes are sealed in a pressure vessel. The membrane surface separates the vessel into two fluid regions wherein the fluid flow between the two regions is accomplished by fluid permeating through the membrane. Any device configuration in which the membrane separates the vessel into two such fluid regions is operable. Such configurations include plate and frame, spiral wound, tubular, and hollow fiber devices. These devices are manufactured by techniques known to one skilled in the art. See U.S. Pat. Nos. 3,228,876; 3,422,008; 3,455,460; 3,475,331; 3,526,001; 3,538,553; 3,690,465; 3,702,658; 3,755,034; 3,801,401; 3,872,014; 3,966,616; 4,045,851; 4,061,574; 4,080,296; 4,083,780; 4,220,535; 4,235,723; 4,265,763; 4,430,219; 4,351,092, 4,337,139; and 4,315,819; incorporated herein by reference.

Water is removed from the liquid hydrocarbon(s) by pervaporation or dialysis. Pervaporation and dialysis are recognized membrane processes. See Sun-Tak Hwang and Karl Kammermeyer, *Membranes in Separations*, Robert E. Krieger Publishing Company, Malabar, Fla., 1984; incorporated herein by reference. In pervaporation, one side of a semipermeable membrane is contacted with a liquid feed, while a sweep gas is passed along the other side of the membrane. Certain components of the liquid feed pass selectively through the membrane and into the sweep gas. Pervaporation involves three steps: (1) selective sorption of the liquid component(s) into the membrane, (2) selective diffusion through the membrane, and (3) desorption into the vapor phase. Dialysis is similar to pervaporation except that a liquid sweep rather than a gas sweep is used.

In this invention, semipermeable cellulosic membranes are used. Cellulosic membranes are water-permeable and relatively hydrocarbon-impermeable. The feed side of the membrane is contacted with a mixture of liquid hydrocarbon(s) and water. The permeate side of the membrane is contacted with a sweep fluid or vacuum under conditions such that the chemical potential of water on the permeate side of the membrane is lower than the chemical potential of water on the feed side of the membrane. The sweep fluid is preferably an inert gas or a hygroscopic liquid. An inert gas refers to a gas which does not deleteriously affect the membrane integrity, does not deleteriously affect membrane performance, and does not create flammability hazards under conditions of use. Preferred inert gases include air, nitrogen, argon, helium, and carbon dioxide. Under some conditions, oxygen or methane may be used as sweep gases. A vacuum includes optionally introducing simultaneously an inert gas on the downstream side of the membrane. Preferred hygroscopic liquids include glycols which are liquids under conditions of use, including ethylene glycol, diethylene glycol, triethylene glycol, tetraethylene glycol, propylene glycol, and dipropylene glycol. Water selectively permeates through the membrane from the feed side to the permeate side of the membrane. The nonpermeated stream which is obtained consists of dried hydrocarbon(s). A dried hydrocarbon refers to a hydrocarbon which has a lower water content than the wet hydrocarbon feed. The rate of water transport across the membrane depends upon the difference in water chemical potential which exists across the membrane, which varies with the water content of the feed liquid hydrocarbon(s) and the water content of the sweep gas or liquid. The rate of water transport is temperature-dependent.

When the membrane is a hollow fiber, the feed may be introduced on either the tubeside or shellside of the device. Whether the membrane is a flat sheet or hollow fiber, the device may be designed and operated so as to promote turbulence on the feed side of the membrane so as to reduce stagnant boundary layers which provide an additional resistance to mass transport through the membrane. Such techniques are known in the art and include incorporation of screens on the feed side of the membrane, introduction of air bubbles into the feed stream, pulsed feed flow, high feed flow rates, and the like. See U.S. Pat. Nos. 4,070,280; 4,208,289; 4,246,120; incorporated herein by reference. The process may be operated in single pass or recirculation mode. In single pass mode, the membrane is contacted with the liquid hydrocarbon(s) once; in recirculation mode, the membrane is repeatedly contacted with the liquid hydrocarbon(s).

The temperature of the feed liquid may be any temperature at which drying of the wet liquid hydrocarbon(s) occurs and which does not deleteriously affect the membrane integrity. Elevated temperatures result in a more rapid water removal rate from the liquid hydrocarbon(s). Preferred liquid feed temperatures range from about 10 to about 50 degrees C., more preferably from about 20 to about 40 degrees C. The temperature of the sweep fluid may be any temperature at which drying occurs and which does not deleteriously affect the membrane integrity.

The pressure of the wet liquid hydrocarbon mixture introduced on one side of the membrane should be sufficient to pump the feed fluid past the membrane but below the pressure at which membrane integrity is adversely affected. In the case of hollow fibers where the feed mixture is introduced down the bores (tubeside feed) of the hollow fibers, the pressure should be below the burst pressure of the fiber. Where the feed mixture is introduced on the outside of the fibers (shellside feed), the feed pressure should be below the collapse presssure of the fiber. The feed pressure is preferably less than about 150 psi, more preferably less than about 70 psi, most preferably less than about 50 psi.

The liquid flow rate may be any rate at which the pressure required to pump the liquid past the membrane remains below the pressure at which membrane integrity is adversely affected. The maximum acceptable flow rate will depend on the membrane device configuration and size. The optimum flow rate and percent removal combination for a given device configuration and size can be readily determined empirically by one skilled in the art.

The amount of water which is removed from the liquid hydrocarbon(s) depends upon the conditions under which the process is carried out. The larger the chemical potential difference across the membrane, the greater the driving force for water transport through the membrane. More membrane surface area per unit feed flow allows greater water removal. Generally, preferred water removal percentages will be at least about 25 percent, more preferably at least about 50 percent.

SPECIFIC EMBODIMENTS

The following examples are included to illustrate the invention only and are not intended to limit the scope of the invention or the claims. Percentages are by weight unless otherwise indicated.

EXAMPLE 1

A 40 cm long laboratory test cell is fabricated from about 24 cellulose triacetate (CTA) hollow fibers measuring 110 microns inside diameter and about 325 microns outside diameter. The fibers are assembled into a bundle, the ends of the fibers being bound together in preparation for potting. The fiber bundle is inserted into a ⅜ inch nominal diameter stainless steel tube to which is attached at both ends stainless steel tees followed by a short piece of ⅜ inch nominal diameter fiberglass tube and a short piece of rubber hose. The rubber hoses are clamped shut around the fiber bundle and an epoxy mixture is injected into each end of the case through the open leg of the tees. The fiber bundle is potted into the tube using a mixture of 78 weight percent DER* 331 epoxy resin (*trademark of The Dow Chemical Company) and 22 weight percent Ancamine* 1922 curing agent (*trademark of Pacific Anchor Chemical Co.). The tubesheets are then cured under a heat lamp for about 1 and ½ hours. The rubber hoses are removed and the fibers are opened using a sharp scalpel. The fibers are dried according to the process described in U.S. Pat. No. 4,430,807. After drying the laboratory test cell, the first tubesheet is removed and a second tubesheet applied.

Wet hexane is passed through the bores of the fibers while dry nitrogen is passed countercurrently on the outside of the fibers. Samples of the hexane influent and effluent are taken and analyzed for water level by the Karl Fisher technique. The water content of the nitrogen used as the sweep gas is determined by a Visalia moisture meter.

Data are presented in Table 1. Water removal is determined at three feed flow rates. The percent removal of water is higher at the higher flow rates. This is because there is a decrease in the boundary layer thickness and thus the resistance to water transport to the membrane wall is decreased.

EXAMPLE 2

The test cell from Example 1 is used to conduct the test in a manner similar to that described in Example 1 except that air rather than nitrogen is used as the sweep gas. The compressed air has a relative humidity of 11 percent at 30 degrees C. Data are shown in Table II. Because the sweep air has a higher water content than the dry nitrogen in Example 1, the driving force for transport across the membrane is lower and less water is removed from the hexane feed.

EXAMPLE 3

The test cell from Example 1 is used to conduct the test in a manner similar to that described in Example 1 except that a vacuum of 0.1 psia is used on the shellside of the device rather than a nitrogen sweep. Data are shown in Table II.

EXAMPLE 4

The test cell from Example 1 is used to conduct the test in a manner similar to that described in Example 1 except that instead of using a sweep gas, the shellside is filled with ethylene glycol. Data are reported in Table II. Upon analyzing a sample of the hexane following the run, about 57 ppm ethylene glycol in the hexane is found due to permeation through the membrane or a slight tubesheet leak.

TABLE I

Hexane Drying at Various Flow Rates Using Nitrogen Sweep
Temperature: Ambient temperature, about 30 degrees C.
Nitrogen Sweep Flow Rate: >2000 cm$^3$/min

| Run | Hexane Flow Rate (cm$^3$/min) | Water Level Hexane (ppm) In | Water Level Hexane (ppm) Out | Removal (%) | Water Level Nitrogen Sweep (ppm) In |
|---|---|---|---|---|---|
| 1-1 | 0.8 | 67.8 | 14.3 | 78.9 | 4.8 |
| 1-2 | 3.0 | 67 | 6.5 | 90.3 | 4.8 |
| 1-3 | 4.5 | 54.7 | 2.7 | 95.1 | 4.8 |

TABLE II

Hexane Drying Using Various Shellside Operational Modes

| Run | Shellside Mode | Water Level Hexane (ppm) In | Water Level Hexane (ppm) Out | Removal (%) |
|---|---|---|---|---|
| 2 | air, 11% relative humidity, 30 degrees C., feed flow rate 4.5 cm$^3$/min | 47.3 | 15.7 | 66.9 |
| 3 | 0.1 psia vaccum, 22-23 degrees C., feed flow rate 4.0 cm$^3$/min | 54.2 | 2.3 | 95.9 |
| 4 | shellside filled with ethylene glycol, 22-23 degrees C., feed flow rate 4.0 cm$^3$/min | 32.4 | 5.6 | 82.7 |

What is claimed is:

1. A pervaporation process for dehydrating liquid hydrocarbons comprising the steps of:
   (a) contacting the upstream side of an asymmetric or composite semi-permeable membrane with a mixture comprised of at least one C$_{4-15}$ liquid hydrocarbon and water, at temperatures and pressures at which the liquid hydrocarbon(s) are dehydrated, wherein the semi-permeable membrane is permeable to water and impermeable to liquid hydrocarbons and comprises a substantially homogeneous and substantially continuous discriminating layer having a thickness of less than about 1 micron and consisting of a cellulosic polymer selected from the group consisting of cellulose esters and cellulose ethers, wherein the water initially present in the liquid hydrocarbon-water mixture is dissolved or entrained in the liquid hydrocarbon(s) or is present as a separate aqueous phase, wherein the discriminating layer has a thickness which has adequate mechanical strength under process conditions and allows transport of water across the membrane at rates which result in at least about 25 percent removal of water from the liquid hydrocarbon-water mixture;

contacting the downstream side of the membrane with an inert sweep gas or vacuum under conditions such that a chemical potential gradient exists across the membrane such that the water selectively permeates through the membrane;
   (c) removing the permeated water from the downstream side of the membrane; and
   (d) removing the nonpermeated liquid C$_{4-15}$ hydrocarbon(s) from the upstream side of the membrane;

wherein the membrane is capable of reducing water present in a liquid hydrocarbon-water mixture to a level of about 15.7 ppm of water when a membrane with a surface area of about 33.2 centimeters$^2$ is contacted on the upstream side with a liquid hydrocarbon-water mixture containing about 47.3 ppm water at about 30° C. at a flowrate of about 4.5 centimeter$^3$/minute while contacting the downstream side of the membrane with an inert sweep gas with a relative humidity of about 11 percent.

2. The process of claim 1 wherein the membrane is comprised of cellulose acetate, cellulose propionate, cellulose nitrate, cellulose butyrate, cellulose cyanoethylate, cellulose methacrylate, ethyl cellulose, or mixed esters or blends thereof.

3. The process of claim 2 wherein the membrane is comprised of cellulose acetates which include cellulose acetate, cellulose diacetate, cellulose triacetate, or blends or mixed acetates thereof.

4. The process of claim 3, wherein the liquid hydrocarbon is a C$_{4-10}$ hydrocarbon or a mixture thereof.

5. The process of claim 4 wherein the pressure is less than about 150 psi.

6. The process of claim 5 wherein the temperature is between about 10 degrees C. and about 50 degrees C.

7. The process of claim 6 wherein the membrane is comprised of cellulose triacetate.

8. The process of claim 7 wherein the liquid hydrocarbon is a C$_{4-8}$ hydrocarbon or a mixture thereof.

* * * * *